(12) United States Patent
Smith et al.

(10) Patent No.: US 7,295,895 B2
(45) Date of Patent: Nov. 13, 2007

(54) METHOD OF INDICATING REMAINING WRAP

(75) Inventors: Kevin M. Smith, Narvon, PA (US); John H. Posselius, Ephrata, PA (US); Nathan Dotson, Winchester, OH (US)

(73) Assignee: CNH America LLC, New Holland, PA (US)

( * ) Notice: Subject to any disclaimer, the term of this patent is extended or adjusted under 35 U.S.C. 154(b) by 255 days.

(21) Appl. No.: 11/206,455

(22) Filed: Aug. 18, 2005

(65) Prior Publication Data

US 2007/0043475 A1    Feb. 22, 2007

(51) Int. Cl.
*G05B 13/00* (2006.01)
*B65B 57/02* (2006.01)
*B65H 21/00* (2006.01)

(52) U.S. Cl. .................. 700/275; 53/67; 242/554; 340/684

(58) Field of Classification Search .............. 700/275; 702/127; 53/67, 118, 508; 242/554, 563.2; 340/684

See application file for complete search history.

(56) References Cited

U.S. PATENT DOCUMENTS

| 4,070,761 A | * | 1/1978 | Collins ................ 33/835 |
| 4,151,403 A | | 4/1979 | Woolston |
| 4,463,913 A | | 8/1984 | Sato |
| 5,607,121 A | | 3/1997 | Boriani |
| 6,774,805 B1 | | 8/2004 | Viesselmann |
| 6,895,296 B2 | * | 5/2005 | Holt et al. ........... 700/139 |
| 2004/0016204 A1 | | 1/2004 | Chow |

* cited by examiner

*Primary Examiner*—Leo Picard
*Assistant Examiner*—Sheela S. Rao
(74) *Attorney, Agent, or Firm*—Stephen A. Bucchianeri; John William Stader; Michael G. Harms

(57) ABSTRACT

A method of measuring the quantity of wrap remaining on a round baler supply roll uses the existing wrap measuring apparatus of a round baler. An on-board microprocessor is programmed to calculate the minimum amount of wrap required for each bale, subtract the amount of wrap used to wrap a bale from the amount of wrap on the supply roll before wrapping the bale, and signal the operator if the amount on the roll is insufficient to wrap a bale. The microprocessor can also be programmed to signal the operator if the amount of wrap on the roll is insufficient to wrap a number of bales specified by the operator.

3 Claims, 2 Drawing Sheets

METHOD OF INDICATING REMAINING WRAP

BACKGROUND OF THE INVENTION

This invention deals generally with bale wrapping farm machinery and more specifically with a method of indicating to the machine operator the quantity of wrap remaining on the wrap supply roll.

Balers that produce cylindrically shaped bales, so called "round balers", are now very common in the agriculture industry, and most such machines include a mechanism to wrap the bale before it exits from the machine. The wrap material can be either a continuous sheet of mesh or a continuous sheet of plastic, and the wrap material is stored on the machine as a large roll from which it feeds into the wrapping mechanism. It is important for the efficient operation of such a system for the operator to know when a material roll will run out of wrap before that actually occurs, or at least one bale will be improperly wrapped.

Perhaps the simplest system used for informing the operator of the impending need to replace a wrap material roll is the same one used for many years on cash registers and adding machines. It involves making the last portion of the material on the roll a unique color. Although this method certainly serves the purpose, it leaves a great deal to be desired. Particularly because bale size can be varied for a machine, the color indicator is indefinite in regard to how many more bales can be wrapped. Furthermore, the operator must actually look for the change of color despite having many other tasks to perform.

Several patents have offered systems that provide information on the quantity of material on a roll, not only for farm machinery, but also for other applications. U.S. Pat. No. 5,607,121 to Boriani et al improves upon the classic method noted above by using an optical sensor to detect the color change near the core of the roll and generate an electronic signal to indicate the approach to the end of the roll. US Patent application 2004/0016204 by Chow et al discloses another common approach to roll quantity measurement. It shows the use of a pivoting arm in contact with the surface of the roll and a sensor that generates a signal at a prescribed thickness of material remaining on the roll. U.S. Pat. No. 6,774,805 to Viesselmann et al discloses a round baler with a sensor with a rotating member in contact with the wrap material to produce a visual indication for the operator of the speed of movement of the wrap material to determine whether the wrapping system is malfunctioning. U.S. Pat. No. 4,463,913 to Sato measures and compares the number of revolutions of the wrap roll to the measured moving length of the wrap to activate a command to decelerate the wrap movement. U.S. Pat. No. 4,151,403 to Woolston measures the revolutions of the roll and the length of material being unwound, and uses a microprocessor to continually determine the length being dispensed for each revolution and the length of wrap remaining on the roll.

The deficiency in all the prior art is that, while by some means they measure the speed of the moving wrap, the amount of wrap on the roll, or both, they essentially furnish only the raw data to the machine operator, and the most that an operator can derive from such information is a rather vague idea of the quantity of wrap on the roll. The prior art does not provide the operator of a round baler with a definite number of bales that can be wrapped from the roll, even when there is an indication that the end of the roll is approaching. In fact, none of the prior art even considers the quantity of wrap being used for each item being wrapped. A superior system would know at all times the number of bales that could be wrapped with the wrap remaining on the roll. Such information would help the operator decide at any time if additional rolls of wrap will be needed for the day's baling. It would be very beneficial for the round baling machine to warn the operator when the wrap on the supply roll has been depleted to a quantity to wrap a number of bales that the operator has previously selected. An even greater benefit would be derived from a system that at all times accommodates to variations in the bale size.

SUMMARY OF THE INVENTION

The present invention is a computer based method for a round baler which measures the amount of wrap used for each bale, subtracts the amount used for each bale from the quantity on the wrap supply roll, warns the operator when the number of bales that can be wrapped with the wrap remaining on the supply roll is below a selected number, and warns the operator and can stop the wrapping if the supply of wrap is insufficient to wrap another bale. The preferred embodiment of the invention requires no added hardware for the typical round baler which already includes a device for measuring the length of wrap being dispensed from the supply roll, an on-board microprocessor within its electronic controller, and display devices.

For the preferred embodiment of the invention the on-board microprocessor is programmed to accept several inputs from the operator. The operator inputs are: the initial length of wrap available on a new roll; the diameter of the bales being formed; and the number of layers of wrap that are to be put onto each bale. The operator also enters information on when a low wrap quantity warning signal is to be generated. This entry is a number indicating how many bales can still be wrapped when the warning signal is given.

At the very beginning of the wrapping program, the microprocessor calculates the minimum quantity of wrap needed for each bale. Then, to start the wrapping of each bale, the microprocessor compares that calculated minimum quantity needed to wrap each bale to the amount of wrap on the supply roll. If there is insufficient wrap on the roll to wrap a bale, the microprocessor generates an "empty" warning signal for the operator and also can be programmed to stop the microprocessor program and the wrapping process if that is desired. Another calculation also takes place before or after each roll is wrapped. The number of bales that still can be wrapped from the roll is predicted by dividing the minimum quantity of wrap required to wrap a bale into the amount of wrap then remaining on the roll. This number of future wrapped bales is then tested against the low wrap warning signal number originally entered by the operator, and a low wrap warning signal is generated if appropriate. As the wrapping of the bale takes place, the length of wrap put onto the bale is measured. The calculation of the amount of wrap remaining on the roll is then made by subtracting the length put onto the bale from the previous length of wrap on the roll, and the quantity of wrap on the roll is updated to a new value.

This entire procedure is repeated each time a bale is to be wrapped. The microprocessor checks if there is sufficient wrap on the roll to wrap a single bale and if the amount on the roll is sufficient to wrap the minimum number of bales specified by the operator and generates the warning signals if they are needed.

The present invention thereby completely relieves the operator from monitoring the wrap supply roll, and permits advance planning for changing the wrap supply roll.

DETAILED DESCRIPTION OF THE INVENTION

Figure 1:
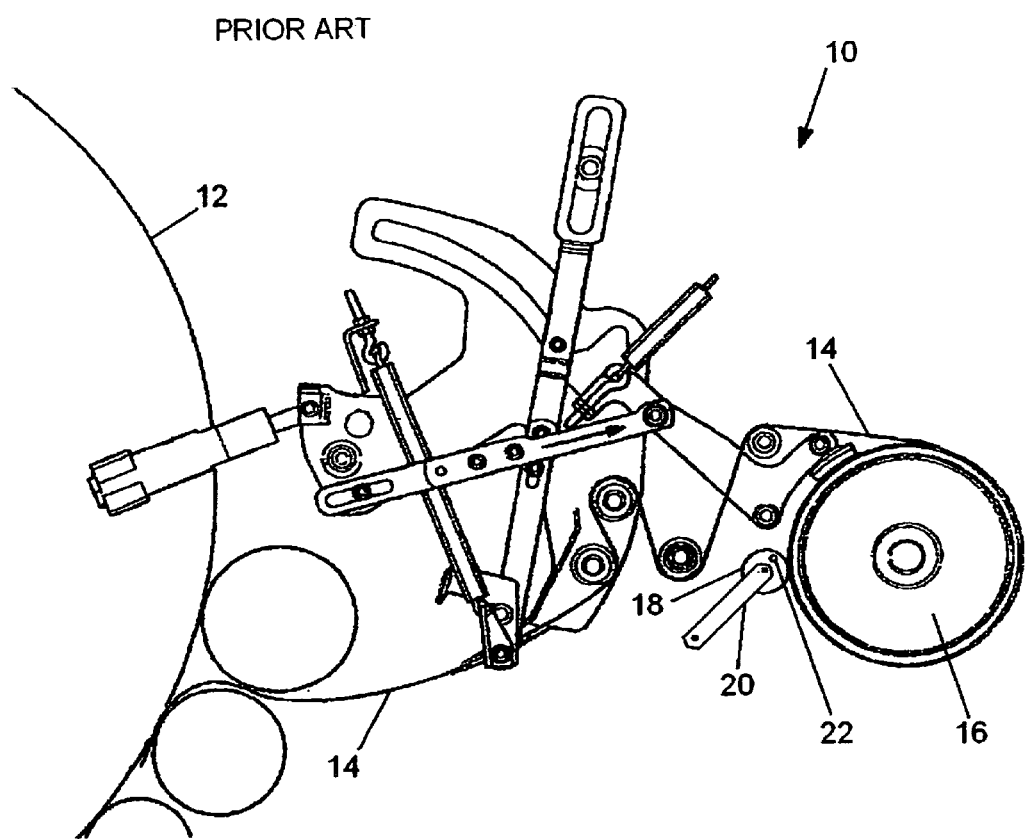
FIG. 1 is a schematic side view of the prior art bale wrapping apparatus upon which the preferred embodiment of the method of the invention is practiced.

FIG. 1 is a schematic side view of prior art bale wrapping apparatus 10 upon which the preferred embodiment of the method of the invention is practiced. Bale 12 is wrapped with wrap 14 that is supplied from roll 16. The only other device in FIG. 1 which applies to the present invention is measuring wheel 18. The other apparatus in FIG. 1 is involved in starting and stopping the wrapping process and cutting the wrap, and is not pertinent to the present invention so it is not identified. Measuring wheel 18 is supported by lever 20 and contacts and rotates with the outer surface of wrap 14 on roll 16. The action of lever 20 permits measuring wheel 18 to move towards the center of roll 16 as wrap 14 is removed from roll 16, and the rotation of measuring wheel 18 therefore always has a direct relationship to the length of wrap 14 being removed from roll 16. Counter 22 is installed on wheel 18, counts the revolutions of wheel 18, and is interconnected with the on-board microprocessor (not shown) of the farm machine upon which bale wrapping apparatus 10 is installed. Counter 22 can be any of a variety of counters such as mechanical, magnetic, or optical devices, but the count is eventually converted into an electronic signal that is sent to the on-board microprocessor which converts the signal into a measurement of the length of wrap dispensed from roll 16.

Figure 2:
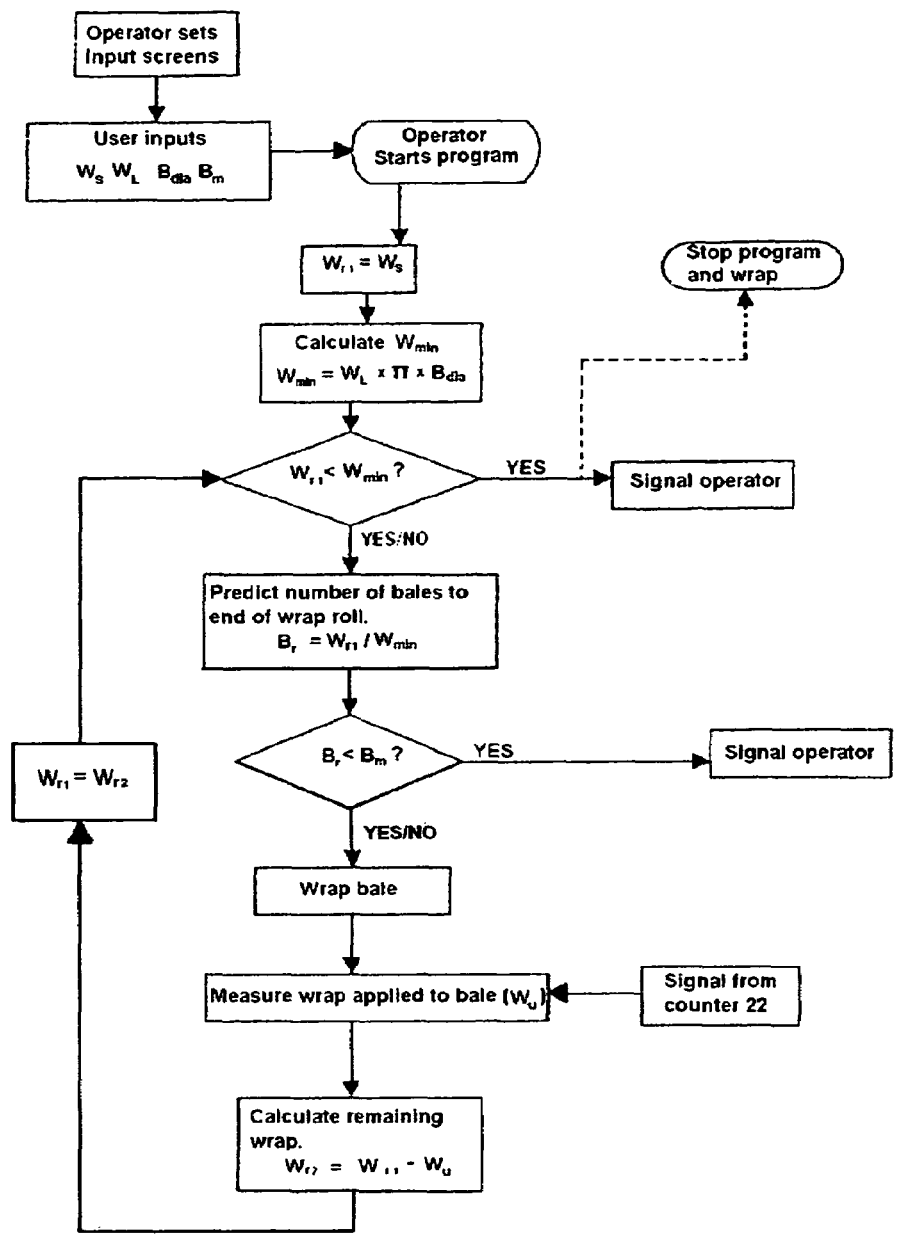
FIG. 2 is a control flow chart of the preferred embodiment of the method of the invention.

FIG. 2 is a control flow chart of the preferred embodiment of the method of the invention in which the control sequence moves generally from top to bottom. The only actions by the machine operator are that of setting the initial parameters which the microprocessor is programmed to accept and starting the program. The operator puts four parameters into the microprocessor memory: $W_s$, $W_L$, $B_{dia}$, and $B_m$. $W_s$ is the length of wrap on the supply roll when it is first installed. This value is available on the original package of the roll. $W_L$ is the number of layers of wrap that are to be put onto each bale. $B_{dia}$ is the diameter of the bales to be formed, and $B_m$ is a selected minimum number of bales that can be wrapped with the wrap remaining on the supply roll below which number a low wrap supply warning signal is to be generated. Once these parameters have been entered, the operator can start the program and essentially ignore the wrap supply situation until the microprocessor generates a warning signal.

The microprocessor first sets $W_s$, the amount of wrap on the roll as $W_{r1}$, the amount of wrap remaining on the roll, and then calculates $W_{min}$, the amount of wrap needed to wrap each bale. This calculation involves simply multiplying $W_L$, the number of layers of wrap to be put on each bale times $B_{dia}$, the bale diameter, times the mathematical function pi. This simple formula yields a value for the minimum length of wrap required to wrap each bale.

Before each wrapping sequence begins, the microprocessor checks whether $W_{r1}$, the wrap remaining on the roll, is less than $W_{min}$, the minimum amount needed to cover a bale. If $W_{r1}$ is less than $W_{min}$ an "empty" signal is generated for the operator. If desired, the microprocessor can also be programmed so that both the wrapping operation and microprocessor program are stopped if $W_{r1}$ is less than $W_{min}$. The operator signal can be a light, a sound, or a computer display.

A second calculation is also performed by the microprocessor before or after every bale is wrapped. This is a prediction of the number of the bales, $B_r$, that can still be wrapped with the amount of wrap, $W_{r1}$, then on the roll. This calculation involves simply dividing $W_{r1}$, the amount of wrap on the roll, by $W_{min}$, the minimum amount of wrap needed to wrap a bale. If $B_r$, the number of bales that can still be wrapped is less than $B_m$, the selected number of bales requiring a warning signal for low wrap supply, the microprocessor generates such a signal for the operator. If $B_r$ is greater than $B_m$, no low warning signal is generated the wrapping operation continues.

However, regardless of the generation of the low warning signal the wrapping of the next bale continues. As the bale wrapping proceeds, the microprocessor receives signals from counter 22 of FIG. 1, converts the signals into $W_u$, the measurement of the wrap used for the bale, and recalculates $W_{r2}$, the amount of wrap remaining on the roll after the bale wrapping is concluded. This calculation of $W_{r2}$ is made by simply subtracting $W_u$, the amount of wrap used, from $W_{r1}$, the amount of wrap on the roll at the start of the wrapping of the last bale. At this point the wrapping sequence begins again as previously described, with the microprocessor using $W_{r2}$ as $W_{r1}$ and checking if $W_{r1}$, the wrap remaining on the roll, is less than $W_{min}$, the minimum amount needed to wrap a bale.

The method of the present invention thereby provides a continuous inventory system of bale wrapping material for the typical round baler along with a warning system that eliminates the need for the operator to be constantly checking whether the wrap supply roll has enough wrap to finish the current job.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, the method could be performed by devices other than an on-board microprocessor, such as a laptop computer, a personal data assistant (PDA), or even an array of preprogrammed individual components. Furthermore, since $B_r$, the predicted number of bales to the end of the roll is always available in the microprocessor, it can be continuously displayed for the operator if such action is desirable.

What is claimed is:

1. A method of measuring the quantity of wrap remaining on a round baler supply roll comprising:

using a control sequencing machine with a memory and calculating capability and;

entering into the machine memory the length of wrap on the supply roll; the number of layers of wrap to be put onto each bale; and the diameter of the bales to be formed;

programming the machine:

(a) to calculate the minimum amount of wrap needed for each bale;

(b) to check if the wrap remaining on the roll is less than the minimum amount needed to cover a bale;

(c) if the wrap remaining on the roll is less than the minimum amount needed to cover a bale, to generate an empty warning signal for the operator;

(d) to then initiate the action of wrapping a bale;

(e) to accept a signal from a wrap length measuring device indicating the amount of wrap used to wrap the bale, to subtract the amount of wrap used to wrap the bale from the amount of wrap on the roll when wrapping the bale began, and to update the amount of wrap on the roll; and (f) to repeat steps (a) through (e) of the program.

2. The method of claim 1 further including:

entering into the machine memory a selected minimum number of bales that can be wrapped with the wrap remaining on the supply roll, below which number a low wrap warning signal is to be generated; and programming the machine:

to predict the number of the bales that can still be wrapped with the amount of wrap remaining on the roll; and if the number of bales that can be wrapped is less than the selected minimum number of bales requiring the low wrap warning signal, to generate the low wrap warning signal for the operator.

3. The method of claim 1 further including programming the machine to stop both the bale wrapping operation and the machine control sequence when an empty warning signal is generated.

\* \* \* \* \*